E. GRAY,
Assignor, by mesne assignments, to THE HARMONIC TELEGRAPH CO.
Electro-Harmonic Telegraphs.
No. 8,870. Reissued Aug. 26, 1879.
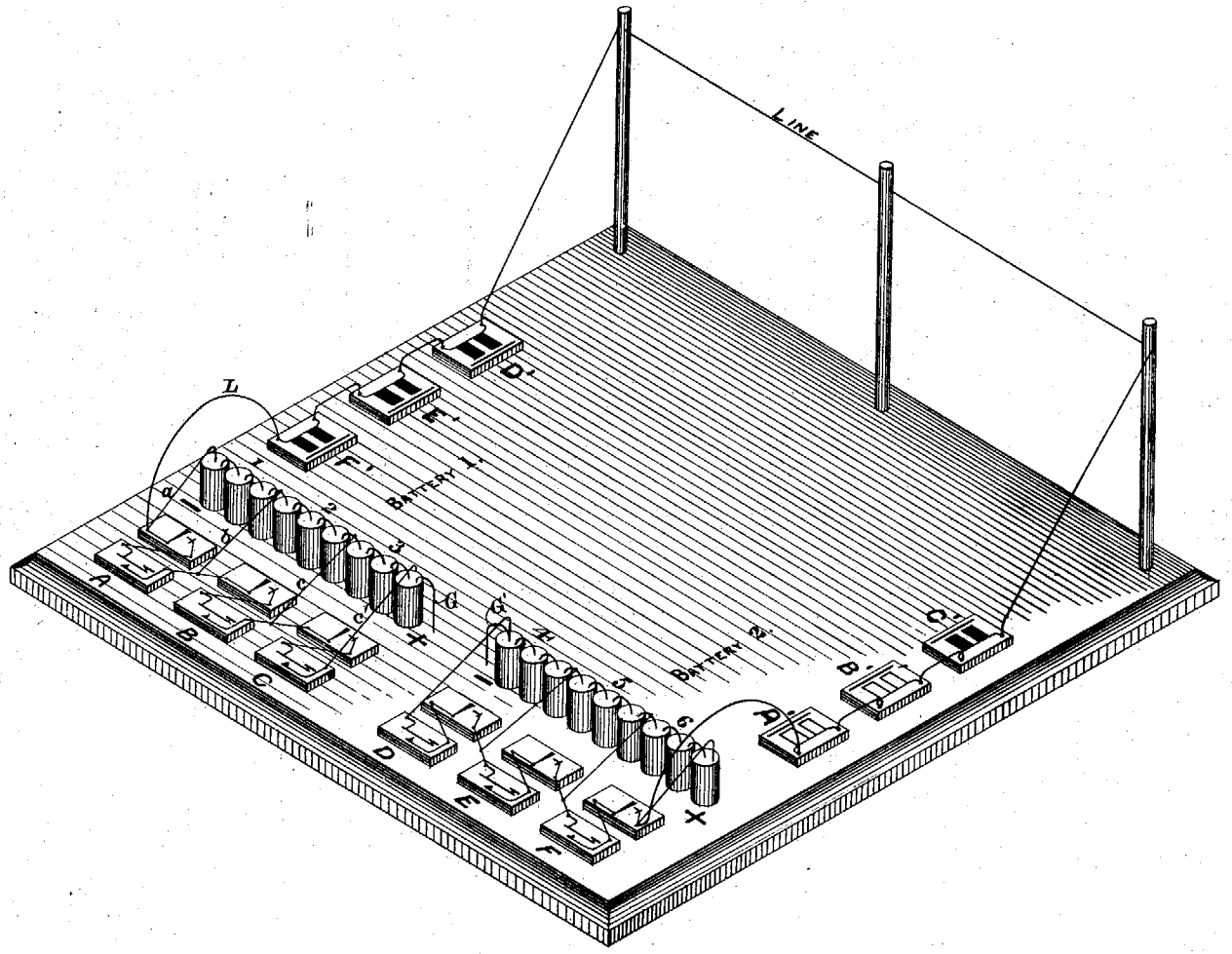
*WITNESSES*
Wm A Stinkle
Geo. W. Breck.
*INVENTOR*
Elisha Gray
*By his Attorneys*
Baldwin, Hopkins & Peyton
N. PETERS, Photo-Lithographer, Washington, D. C.

UNITED STATES PATENT OFFICE.

ELISHA GRAY, OF CHICAGO, ILLINOIS, ASSIGNOR, BY MESNE ASSIGNMENTS TO THE HARMONIC TELEGRAPH COMPANY, OF NEW YORK CITY

IMPROVEMENT IN ELECTRO-HARMONIC TELEGRAPHS.

Specification forming part of Letters Patent No. 186,340, dated January 16, 1877; Reissue No. 8,870, dated August 26, 1879; application filed June 3, 1878.

*To all whom it may concern:*

Be it known that I, ELISHA GRAY, of Chicago, in the county of Cook and State of Illinois, have invented certain new and useful improvements in apparatus for transmitting and analyzing rhythmical impulses, vibrations, or waves representing musical impressions, sounds, or tones, of which improvement the following is a specification.

My invention is based upon, and more especially relates to, an electro-harmonic system of multiple telegraphy heretofore invented by me, and described in sundry Letters Patent of the United States granted to me during the years 1875 and 1876.

In an application for Letters Patent of the United States filed by me February 23, 1875, for transmitting musical vibrations by electricity, I have shown not only various devices for transmitting and receiving rhythmical vibrations representing musical impressions, sounds, or tones, but also one method of arranging an electric circuit for producing the desired result, including the relation of the main battery to the line and instruments at both ends, and described the effects produced, this being also what is known as an "open" circuit.

In my prior patents and in the application above mentioned the full force of the battery was at all times exerted upon the line—that is to say, when one transmitter was employed and the others were at rest, it worked with the full force of the whole main battery. When all the transmitters were thrown into action the same electro-motive force was necessarily divided among them; consequently the amplitude of the vibrations of any given tone was diminished or increased according to the number of tones simultaneously sent to line, thus rendering analysis at the receiving-station more difficult My present improvement contemplates the avoidance of this objection by insuring the transmission of tones of uniform amplitude of wave, whether a greater or less number of tones be transmitted simultaneously, which end I attain by combining each transmitting apparatus with its respective section of the main battery by a short or "shunt" circuit in such manner that each section is utilized for the transmission of the vibrations constituting its own tone without reference to or drawing upon the other sections of the battery or opening the main circuit, and when not transmitting the unemployed sections of the battery flow steadily to line without affecting the working of the transmitters of the other sections.

My improvement possesses the following distinctive characteristics: First, the main or primary circuit always remains closed; second, the combination, with said circuit, of a series of transmitters capable of being thrown into or out of action without interrupting the continuity of the main current; third, the passage through this circuit of a continuous or uninterrupted electric current which is of uniform strength when all the transmitters are quiescent, each transmitter when in operation throwing its respective portion of said current into vibration, so that the form of vibration existing in the normal current at any given time is the component or resultant of the several coexistent simple vibrations; fourth, the conversion of these composite or resultant electrical vibrations into magnetic vibrations of corresponding form by means of electro-magnetism, this last result being facilitated by keeping the cores of the receiving-magnets in a constantly-charged or magnetically-polarized state.

The subject-matter claimed hereinafter specifically will be designated.

I have said that my invention relates, in part, to a constantly-closed circuit and a continuous current with apparatus for transmitting rhythmical vibrations, which are converted at the receiving-station into corresponding magnetic vibrations by means of constantly-polarized electro-magnets.

By a continuous current I do not mean a current necessarily of uniform strength, (the current, in fact, constantly varies in strength,) but that under no conditions described in the operation of the apparatus is there a time when there is no current upon the line.

I have found by a series of experiments made before the filing of the application for the original patent upon which this reissue is based that a magnet in a polarized or constantly-charged condition is far more responsive to electrical vibrations transmitted through it from a given source of power than when in a neutral or non-polarized condition. In other words, if I wish to transmit a single tone, using only a single section of battery, this can be far more effectually done if the other sections of the battery are in the main line, although the power from them is not in any sense put in vibration, and the only function it performs is to keep the receiving magnet or magnets charged up to a certain degree of magnetic tension, which renders the magnet far more susceptible of any additional electrical force that may be superposed upon it. In my experiments above mentioned I found that where several tones are transmitted, each using a corresponding number of sections of battery in the line—such, for instance, as shown in the present case—that an independent means of keeping the receiving-magnet in a constantly-polarized state was unnecessary, as the magnets are kept in a sufficiently constant state of polarization in the manner hereinbefore described.

The accompanying drawing represents a perspective diagram of so much of my improved apparatus as is necessary to illustrate the subject-matter claimed.

I have shown this apparatus as constructed in the best way known to me at the date of filing my original application; but it is obvious that the details of construction of its various parts may be varied within certain limits in ways well known to skillful electricians.

I have shown three transmitters, with their batteries and corresponding receivers at each end of the line, so arranged as to transmit three messages each way simultaneously; but a greater or less number of transmitters and receivers may be employed, and they might be so arranged as all to transmit one way instead of in opposite directions.

It is deemed unnecessary to describe in detail here the construction of the battery, as it forms no part of the subject-matter claimed, and any of the well-known batteries of the present day will work effectively with my improved apparatus.

The construction of the transmitters and receivers is fully set forth and described in my Letters Patent and application above mentioned, and needs no reiteration here.

Each battery is connected with its respective transmitter by a short-circuit or shunt wire. Starting with battery No. 1, G is the ground-wire, connected at the plus (+) pole of the battery, which battery is connected up in the ordinary way and runs to line at the other or minus (—) end through the analyzing-receivers F′ E′ D′. The line connects at the other end through the analyzing-receivers C′ B′ A′ to the plus (+) pole of the battery No. 2, and passes through in the ordinary way to the ground-wire G′ at the minus (—) pole of said battery. The circuit thus far is similar to an ordinary Morse circuit closed, and without a key or other means of making or breaking the circuit.

A B C D E F represent six sets of transmitters, each set being composed of a common "open-circuit" Morse telegraphic key and a musical-tone transmitter—such, for instance, as that described in Letters Patent No. 165,728 aforesaid, granted to me July 20, 1875, for improvement in transmitters for electro-harmonic telegraphs. These transmitters are all alike in construction; but each one is tuned to a different pitch, and has a receiver, A′ B′ C′ D′ E′ F′, correspondently tuned, at the other end of the line.

Each battery is divided into sections 1 2 3 4 5 6, not by separating or disconnecting its cells, but by throwing a short-circuit or shunt wire around each section. For instance, the first short circuit of battery 1 consists of the wires *a b*, second of the wires *b c*, and the third of the wires *c c′*, and so on. The number of cells in each section is determined by the distance the tone is to be transmitted.

Each shunt-wire runs through its own key and vibrating transmitter. For instance, in section 1 of battery 1, which is at the line end of the battery, a wire, *a*, passes from the minus (—) pole of the battery to one binding-screw of the transmitter A, at which point the circuit divides, one branch connecting to line L, and the other to the vibrating bar of the transmitter through the break-point, which is, in this instance, a shunting-point. The circuit then passes to the other binding-screw, and thence to a key-lever.

The anvil or lower point of the key is connected directly with the ends of the wire *b*, which forms the dividing-line between sections 1 and 2, forming part of the short circuit of each section, and so on. Now, if the reed or bar of transmitter A be vibrated by its local battery, (which is omitted from the drawing to avoid complication, but the operation of which is well understood,) and the key belonging to it, and in the same circuit with it, be depressed, the shunt-circuit around section 1 will be completed every time the vibrating bar or reed makes contact with its break-point, thus producing a set of waves or electrical vibrations throughout the line, the waves succeeding each other at the rate per second corresponding to the vibrations of the transmitting reed or bar, which waves will induce corresponding impulses in all the magnets of a power approximating one-sixth of the whole battery.

It will be observed that when two or more sets of vibrations are transmitted through the circuit simultaneously the electro-motive force acting to produce a current at any given moment will depend upon the number of separate and distinct pulsations or vibrations which are being communicated to the line at that moment; and as the total resistance of the circuit remains, for all practical purposes, constant, the effective strength of current traversing the circuit and capable of acting upon the receiving apparatus is constantly being varied in a manner and to an extent precisely corresponding to the amplitude of the magnetic vibrations which it is desired to produce at the receiving-station. Although these magnetic impulses are produced equally in the cores of all the magnets in the circuit and an equivalent mechanical action is exerted upon each one of the armatures of the several magnets, yet in the case just mentioned only the armature of the receiver marked A′ will respond to the magnetic impulses resulting from the action of the transmitter, it being the only one whose reed or ribbon (or reed and box, as the case may be) is tuned correspondently with the transmitter in operation. All the other sections of the apparatus are connected up and operated in a manner precisely similar, each operating its own section of battery. Each transmitter differs in pitch from every other one and has its complement in its corresponding receiver. Thus the individuality of each separate series of waves is always preserved, and they may be reproduced at the receiving-station with absolute fidelity and accuracy.

The utility of the device has been amply demonstrated by practical operation.

I claim as of my own invention—

1. The combination, substantially as hereinbefore set forth, of a constantly-closed primary electric circuit or main line and apparatus for producing two or more series of rhythmical vibrations representing musical impressions or sounds, or composite tones, so arranged as to throw said vibrations upon the main line without interrupting the continuity of its circuit.

2. The combination, substantially as hereinbefore set forth, of a constantly-closed primary electric circuit or main line, apparatus for transmitting rhythmical vibrations representing sounds or tones capable of being thrown into or out of action without interrupting the continuity of the main-line circuit, and constantly charged or polarized electro-magnets included in the closed main circuit.

3. The combination, substantially as hereinbefore set forth, of a series of transmitters, each operated by a local battery, a main battery, a primary electric circuit or main line through which a continuous current flows from said battery, and shunt or short circuits between the main battery and transmitters.

4. The combination, substantially as hereinbefore set forth, of a series of transmitters, a main battery connected therewith by short or shunt circuits, a closed primary electric circuit or main line through which a current continuously flows from the main battery, and a series of receivers included in the circuit.

ELISHA GRAY.

Witnesses:

WM. D. BALDWIN,

WM. J. PEYTON.